United States Patent Office 3,083,093
Patented Mar. 26, 1963

3,083,093
PROCESS FOR ELIMINATING TITANIUM FROM PRODUCTS OBTAINED BY THE CARBOTHERMIC REDUCTION OF ALUMINUM ORES
Erhard Grunert, La Tronche, France, assignor to Pechiney, Compagnie de Produits Chimiques et Electrometallurgiques, Paris, France, a corporation of France
No Drawing. Filed Mar. 10, 1959, Ser. No. 798,351
Claims priority, application France May 10, 1958
10 Claims. (Cl. 75—63)

It has already been proposed to manufacture pure alumina in the form of corundum by partial reduction of bauxite with carbon in an electric furnace. By exercising great care, it is possible to obtain a corundum containing at most 0.05% iron and 0.05% silicon; however, its titanium content may amount to 0.2–0.3%.

When this purified corundum is reduced by carbon in an electric arc furnace so as to obtain an alloy of aluminum and aluminum carbide containing a small amount of alumina (less than 3%), and when this aluminum is separated from the above mentioned alloy as, for example, by means of a flux, the produced metal contains 0.3 to 0.5% titanium, which renders its use impossible for certain purposes.

The present invention, which is based on applicant's investigations, relates to a process which enables the elimination of the titanium contained in the products obtained by the carbothermic reduction of aluminum ores. This process consists in adding to the reduction furnace small quantities of substances containing boron, such as anhydrous borax, boric acid, boron carbide, boracite, etc. The resultant products contain but small quantities of titanium.

The following examples, which are not given by way of limitation, will give a better understanding of the invention.

Example I

Into a furnace wherein a titanium containing bauxite ore has been partially reduced by carbon to produce a very pure corundum containing 0.3% titanium, there is added to the melt, shortly before tapping, a small quantity of boric acid. When the operation is completed the formed boro-titanate settles at the bottom of the melt, whereupon the corundum is tapped in a liquid state and is sprayed (blown) with air at the outlet of the tapping lip. The resultant small spherules contain:

Fe _____ 0.05%.
Si _____ 0.05%.
Ti _____ 0.02% in lieu of the original 0.3%.

The percentage titanium content is therefore fifteen times smaller, thanks to the use of the process of the present invention.

Example II

Corundum containing 0.3% titanium was reduced by carbon in an electric arc furnace of 120 kw. The periodically added charges had the following composition:

| | Kg. |
|---|---|
| Titaniferous corundum | 5 |
| Carbon | 2.6 |
| Borax | 0.2 |

After operating the arc furnace for 4 hours, there was obtained 21 kilos of an $Al_4C_3$–Al alloy having a free aluminum content of 62%. This alloy was then treated with a flux of molten sodium chloride whereby there was recovered 13.9 kg. aluminum containing 0.0002% titanium.

The titanium originating from the corundum accumulated in the sludge (slime) of aluminum carbide crystals constituting the residue from the flux treatment. This sludge contains about 1% titanium.

Thanks to the process of the present invention, the resultant aluminum contains less titanium than the metal produced by electrolysis of Bayer alumina and can be used advantageously in all the applications of aluminum.

As a general rule, the amount of the boron compound used preferably ranges from one to two times the amount theoretically required for the stoichiometric conversion of the titanium contained in the starting material, more particularly in the aluminum oxide, into boro-titanium. Also, as will be observed from the examples, the boron compounds can either be introduced directly into the furnace during the reduction of aluminum oxide by carbon or else, can be added and/or mixed with a charge of corundum and/or carbon supplied to the furnace. The temperature in the furnace generally ranges from 2000° C. to 2400° C. Higher temperatures can likewise be employed; however, the preferred reduction temperature is about 2400° C.

I claim:

1. In the process for removing titanium from molten aluminum oxide containing a small amount of titanium as an impurity, the steps of introducing into said molten bath of aluminum oxide a compound of boron capable of reaction with the titanium at the temperature conditions existing to form a boron-titanate compound which is separable from the molten aluminum oxide, and then separating the boron-titanium compound from the molten aluminum oxide.

2. In the process of removing titanium from molten aluminum oxide containing a small amount of titanium as an impurity, the steps of adding a compound of boron capable of reaction with the titanium at a temperature above 2000° C. to form a boron-titanium compound which is separable from the molten aluminum oxide, and then separating the boron-titanium compound from the aluminum oxide.

3. A process according to claim 2, wherein the materials are heated to within the temperature range of about 2000°–2400° C.

4. Process according to clam 2, wherein the boron compound is selected from the group consisting of anhydrous borax, boric acid, boron carbide and boracite.

5. Process according to claim 2, wherein the amount of boron compound used ranges from one to two times the amount required for the stoichiometric conversion of the titanium in the molten bath.

6. In the process of producing aluminum by the carbothermic reaction of aluminum oxide and carbon to produce a mixture of aluminum and aluminum carbide, the removal of titanium as an impurity comprising the steps of adding a compound of boron capable of reaction with titanium under the temperature conditions existing to form a boron-titanium compound which is separable from the aluminum-aluminum carbide reaction product while the latter is in the molten state, and then separating the boron-titanium compound that is formed from the molten aluminum-aluminum carbide.

7. Process according to claim 6, wherein the boron compound is selected from the group consisting of anhydrous borax, boric acid, boron carbide, and boracite.

8. Process according to claim 6, wherein the amount of boron compound used ranges from one to two times the amount required for the stoichiometric conversion of the titanium in said charge.

9. In the process of removing titanium from molten aluminum oxide containing a small amount of titanium as an impurity, the steps of adding a compound of boron capable of reaction with titanium at a temperature above 2000° C. to form boron titanate which is separable from the molten aluminum oxide, and then separating the boron titanate from the molten aluminum oxide.

10. In the process of producing aluminum by the carbothermic reaction of aluminum oxide and carbon at a temperature above 2000° C. to produce a mixture of aluminum and aluminum carbide, the removal of titanium as an impurity comprising the steps of adding a compound of boron capable of reaction with titanium under the temperature conditions existing to form boron titanate which is separable from the aluminum-aluminum carbide reaction product while the latter is in a molten state, and then separating the boron titanate that is formed from the molten mixture of aluminum-aluminum carbide.

References Cited in the file of this patent

UNITED STATES PATENTS

| | | |
|---|---|---|
| 612,161 | Griffith | Oct. 11, 1898 |
| 982,218 | Mellen | Jan. 17, 1911 |
| 1,920,963 | Bonsack | Aug. 8, 1933 |
| 1,921,998 | Bonsack | Aug. 8, 1933 |
| 2,829,961 | Miller | Apr. 8, 1958 |
| 2,906,605 | Dubeck | Sept. 29, 1959 |

FOREIGN PATENTS

| | | |
|---|---|---|
| 118,605 | Great Britain | July 3, 1919 |